United States Patent
Ogaki et al.

(10) Patent No.: US 11,342,595 B2
(45) Date of Patent: May 24, 2022

(54) POWER CONSUMPTION CONTROL DEVICE

(71) Applicant: HONDA MOTOR CO., LTD., Tokyo (JP)

(72) Inventors: Toru Ogaki, Saitama (JP); Naoya Okada, Saitama (JP); Keisuke Fujimaki, Saitama (JP); Kodai Kasai, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 57 days.

(21) Appl. No.: 17/055,273

(22) PCT Filed: May 16, 2018

(86) PCT No.: PCT/JP2018/018910
§ 371 (c)(1),
(2) Date: Nov. 13, 2020

(87) PCT Pub. No.: WO2019/220560
PCT Pub. Date: Nov. 21, 2019

(65) Prior Publication Data
US 2021/0126292 A1    Apr. 29, 2021

(51) Int. Cl.
*H01M 10/42* (2006.01)
*H01M 10/615* (2014.01)
(Continued)

(52) U.S. Cl.
CPC ........... *H01M 10/425* (2013.01); *B60L 50/60* (2019.02); *H01M 10/615* (2015.04);
(Continued)

(58) Field of Classification Search
CPC ............. H01M 10/425; H01M 10/615; H01M 10/625; H01M 10/63; H01M 10/6571;
(Continued)

(56) References Cited

U.S. PATENT DOCUMENTS

2018/0281618 A1   10/2018   Ogaki et al.
2019/0039477 A1   2/2019    Ohgaki et al.

FOREIGN PATENT DOCUMENTS

JP   2000-012104 A   1/2000
JP   2012-085467 A   4/2012
(Continued)

OTHER PUBLICATIONS

Aug. 7, 2018, International Search Report issued for related PCT application No. PCT/JP2018/018910.
(Continued)

*Primary Examiner* — Robert L Deberadinis
(74) *Attorney, Agent, or Firm* — Paratus Law Group, PLLC (57) ABSTRACT

A power consumption control device includes: a storage battery; a heating unit; a storage unit storing a combination of a temperature of the storage battery and a remaining capacity of the storage battery in association with an increase amount in an effective capacity of the storage battery when the storage battery is heated by the heating unit which is supplied with each of the heating powers; a control unit configured to determine a first power which can be charged to the storage battery and to distribute the first power to the storage battery and the heating unit so that the increase amount in the effective capacity of the storage battery is maximized based on the first power, the increase amount for each of heating powers corresponding to the temperature of the storage battery and the remaining capacity of the storage battery, and the heating powers.

5 Claims, 3 Drawing Sheets

(51) Int. Cl.
*H01M 10/625* (2014.01)
*H01M 10/63* (2014.01)
*H01M 10/6571* (2014.01)
*B60L 50/60* (2019.01)
*H02J 7/00* (2006.01)
*H02J 1/00* (2006.01)

(52) U.S. Cl.
CPC ......... *H01M 10/625* (2015.04); *H01M 10/63* (2015.04); *H01M 10/6571* (2015.04); *H02J 7/0063* (2013.01); *H01M 2010/4271* (2013.01); *H01M 2220/20* (2013.01)

(58) Field of Classification Search
CPC ..... H01M 2010/4271; H01M 2220/20; H01M 10/42; H02J 7/0063; H02J 7/00; B60L 50/60
See application file for complete search history.

(56) References Cited

FOREIGN PATENT DOCUMENTS

WO   WO 2017/056161 A1   4/2017
WO   WO 2017/056162 A1   4/2017

OTHER PUBLICATIONS

Aug. 7, 2018, International Search Opinion issued for related PCT application No. PCT/JP2018/018910.

POWER CONSUMPTION CONTROL DEVICE

CROSS REFERENCE TO PRIOR APPLICATION

This application is a National Stage Patent Application of PCT International Patent Application No. PCT/JP2018/018910 (filed on May 16, 2018) under 35 U.S.C. § 371, which is hereby incorporated by reference in its entirety.

TECHNICAL FIELD

The present invention relates to a power consumption control device.

BACKGROUND ART

In a plug-in type electric vehicle such as an electric vehicle (EV) or a hybrid electrical vehicle (HEV) equipped with an electric motor driven by a power supplied from a storage battery as a drive source, a heater for heating the storage battery is provided (see, for example, Patent Literature 1 and Patent Literature 2).

Patent Literature 1 describes that the change in an effective capacity of a storage battery when the storage battery is heated to a target temperature by a heater is estimated and the heater is energized from the storage battery only when the effective capacity is expected to be increased.

Patent Literature 2 describes that the change in an effective capacity of a storage battery when the storage battery is heated to a target temperature by a heater is estimated and the usage (whether to use for a heater, for charging, or for both the heater and charging) of power converted by a charger is controlled according to the estimated change in the effective capacity.

Patent Literature 1: WO 2017/056161
Patent Literature 2: WO 2017/056162

SUMMARY OF INVENTION

An effective capacity (capacity which can be used to operate an electric vehicle of a charging capacity) of a storage battery of an electric vehicle decreases in a low temperature environment. Therefore, in order to increase the effective capacity of the storage battery, it is effective to heat the storage battery with a heater when starting or charging the electric vehicle. In recent years, plug-in type electric vehicles are required to be equipped with a heater which consumes a large amount of power as the performance (vehicle output, range, charging time, securing startup) required in a low temperature environment is improved.

However, for example, when charging the storage battery of the electric vehicle from a household 100 V power supply, if a large amount of power is consumed in the heater, a situation may occur in which the power for increasing a state of charge (SOC) of the storage battery is insufficient. On the other hand, even when the storage battery is charged without using the heater and the SOC becomes a high value, if the temperature of the storage battery is low, an increase in the effective capacity is small. Therefore, depending on the environmental temperature, a situation may occur in which a cruising range of the electric vehicle remains short even though the SOC is high when charging is completed.

Patent Literature 1 and Patent Literature 2 do not consider the case where the power consumption of the heater becomes large.

The invention is made in view of the circumstances described above and an object thereof is to provide a power consumption control device which can efficiently charge and heat a storage battery and increase a cruising range of an electric vehicle at the end of charging.

According to an aspect of the invention, there is provided a power consumption control device which includes a storage battery configured to supply power to an electric motor as a drive source for a plug-in type electric vehicle, a heating unit configured to heat the storage battery by receiving supply of any one of a plurality of heating powers, a storage unit storing a combination of a temperature of the storage battery and a remaining capacity of the storage battery in association with an increase amount in an effective capacity of the storage battery when the storage battery is heated by the heating unit which is supplied with each of the plurality of heating powers, a power conversion unit configured to convert a power supplied from an external power source and to supply the converted power to at least one of the storage battery and the heating unit, and a control unit configured to determine a first power which can be charged to the storage battery and to distribute the first power to the storage battery and the heating unit based on a power suppliable to the storage battery and the heating unit of the converted power, the temperature of the storage battery, and the remaining capacity of the storage battery, where the control unit distributes the first power to the storage battery and the heating unit so that the increase amount in the effective capacity of the storage battery is maximized based on the first power, the increase amount for each of the plurality of heating powers corresponding to the temperature of the storage battery and the remaining capacity of the storage battery, and the plurality of heating powers.

According to the invention, it is possible to provide a power consumption control device capable of efficiently charging and heating a storage battery to increase a cruising range of an electric vehicle at the end of charging.

DESCRIPTION OF EMBODIMENTS

Hereinafter, an embodiment of the invention will be described with reference to the drawings. A power consumption control device of the embodiment is mounted on a plug-in type electric vehicle such as an EV or HEV provided with an electric motor driven by electric power supplied from a storage battery as a drive source.

Figure 1:
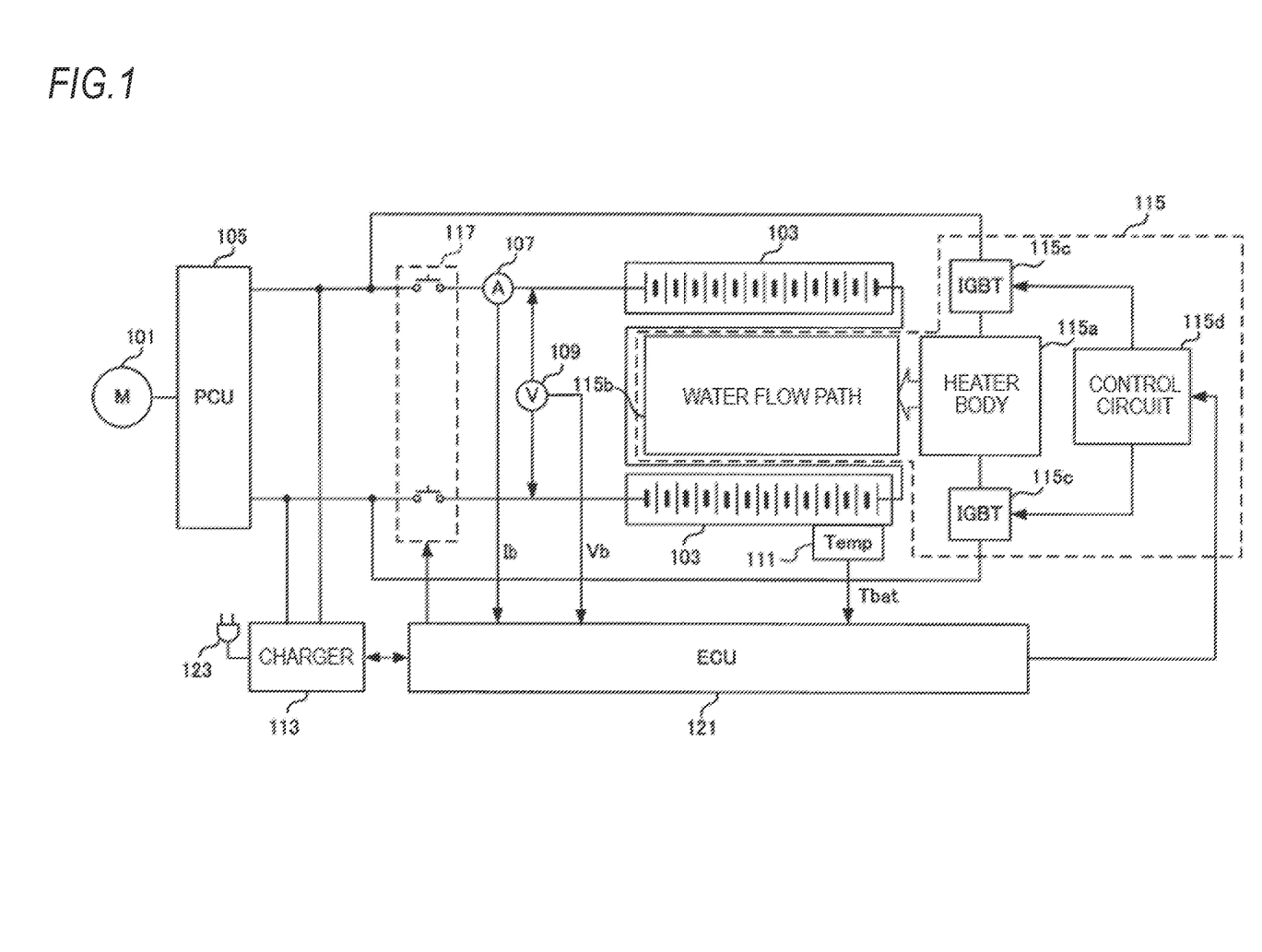
FIG. 1 is a diagram illustrating a schematic configuration of a power consumption control device according to an embodiment of the invention.

FIG. 1 is a diagram illustrating a schematic configuration of the power consumption control device according to the embodiment of the invention. The power consumption control device illustrated in FIG. 1 includes an electric motor 101, a storage battery 103, a power control unit (PCU) 105, a current sensor 107, a voltage sensor 109, a temperature sensor 111, a charger 113 which functions as a power conversion unit, a heater 115, a switch unit 117, and an electric control unit (ECU) 121.

The electric motor 101 is a drive source which generates power for an electric vehicle to travel.

The storage battery 103 includes a plurality of storage cells such as a lithium ion battery or a nickel hydrogen battery, and supplies high voltage power to the electric motor 101.

When using the storage battery 103, which is a secondary battery, it is necessary to constantly monitor a remaining capacity (state of charge (SOC)) of the storage battery 103 and perform the prevention control of over-charging or over-discharging. After such control is performed, the storage battery 103 is repeatedly charged and discharged within the SOC range (0% to 100%) in which the storage battery 103 can be used.

The SOC of the storage battery 103 is derived based on one or both of an integrated value of the charge/discharge current of the storage battery 103 and an open circuit voltage (OCV) of the storage battery 103.

The PCU 105 converts the DC power output by the storage battery 103 into alternating current. The PCU 105 may convert the DC output voltage of the storage battery 103 into alternating current after stepping down or boosting the direct current as it is.

The current sensor 107 detects the charge/discharge current of the storage battery 103. A signal indicating the current value detected by the current sensor 107 is sent to the ECU 121.

The voltage sensor 109 detects the terminal voltage (also referred to as a closed circuit voltage (CCV)) of the storage battery 103. A signal indicating the voltage value detected by the voltage sensor 109 is sent to the ECU 121.

The temperature sensor 111 detects the temperature of the storage battery 103. A signal indicating the temperature of the storage battery 103 detected by the temperature sensor 111 is sent to the ECU 121.

The charger 113 converts alternating current power supplied from an external power source into direct current in a state where a plug 123 is connected to the external power source (not illustrated), The DC electric power converted by the charger 113 is respectively supplied to the storage battery 103, the heater 115, and devices (for example, audio equipment or air conditioner) other than the storage battery 103 and the heater 115 mounted on the electric vehicle, respectively. The power (hereinafter referred to as a usable power Pa) excluding the power required for the operation of the devices from the DC power converted by the charger 113 is the maximum power which can be supplied to the storage battery 103 and the heater 115.

The power (hereinafter referred to as a charging power A) which can be charged to the storage battery 103 of the usable power Pa is determined based on the usable power Pa, the SOC of the storage battery 103, and the temperature of the storage battery 103, The charging power A forms the first power.

When the power of the above-described devices of the electric vehicle is turned off while the plug 123 is connected to the external power source, the DC power converted by the charger 113 becomes the usable power Pa as it is.

The switch unit 117 opens or closes the current path from the charger 113 to the storage battery 103. The switch unit 117 is opened and closed under the control of the ECU 121.

The heater 115 generates heat when a current supplied from the storage battery 103 or a current supplied from the external power source (not illustrated) via the charger 113 is energized and the heat is used to heat the storage battery 103.

In the example of FIG. 1, the heater 115 is an electric coolant heater (ECH) and includes an insulated gate bipolar transistor (IGBT) 115c connected to a connection point between the charger 113 and the switch unit 117, a heater body 115a which generates heat when a current supplied from the storage battery 103 via the switch unit 117 and the IGBT 115c or a current supplied from the external power source (not illustrated) via the charger 113 and the IGBT 115c is energized, a water flow path 115b for circulating the water, including water heated by the heat of the heater body 115a, and a control circuit 115d which controls the IGBT 115c.

The control circuit 115d controls the IGBT 115c by pulse width modulation (PWM) under the control of the ECU 121 to switch a power consumption Bx (the electric power supplied to the heater body 115b, hereinafter also referred to as the output of the heater 115) during operation of the heater 115 at a plurality of values. In the following, for example, it is assumed that the power consumption Bx can be switched at three values of 1 kW, 3 kW, and 6 kW.

When the charging power A is greater than the power consumption Bx in a state where the switch unit 117 is closed, the power consumption Bx (1 kW, 3 kW, or 6 kW) of the charging power A supplied from the charger 113 is supplied to the heater 115 and the remaining power obtained by subtracting the power consumption Bx from the charging power A is supplied to the storage battery 103.

The power consumption Bx of the heater 115 is the heating power used for heating the storage battery 103. Therefore, the heater 115 functions as a heating unit which heats the storage battery 103 by receiving the supply of any one of the plurality of heating electric powers (here, 1 kW, 3 kW, and 6 kW).

The ECU 121 comprehensively controls the entire power consumption control device and includes various processors which execute programs to perform processing, a random access memory (RAM), and a read only memory (ROM).

As various processors, it includes a dedicated electric circuit, which is a processor having a circuit configuration specially designed for executing a specific process, such as a central processing unit (CPU) and an application specific integrated circuit (ASIC) which are general-purpose processors that execute programs and perform various processes. More specifically, the structures of those various processors are electric circuits in which circuit elements such as semiconductor elements are combined.

The processor of the ECU 121 may be configured with one processor of various processors or may be configured with a combination of two or more processors of the same type or different types.

Figure 2:
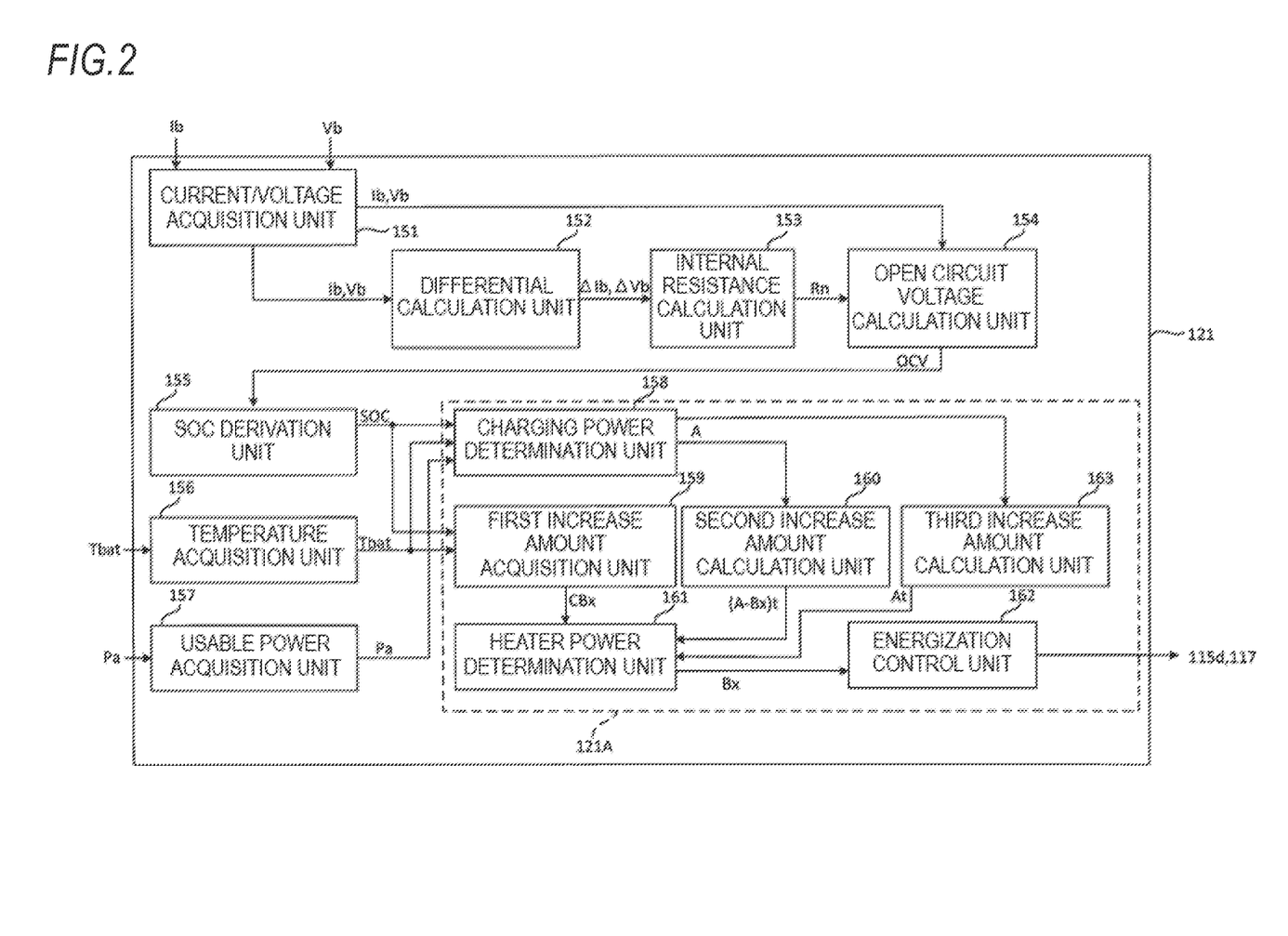
FIG. 2 is a diagram illustrating a functional block of an ECU illustrated in FIG. 1.

FIG. 2 is a diagram illustrating a functional block of the ECU 121 illustrated in FIG. 1. The processor of the ECU 121 functions as a current/voltage acquisition unit 151, a differential calculation unit 152, an internal resistance calculation unit 153, an open circuit voltage calculation unit 154, an SOC derivation unit 155, a temperature acquisition unit 156, a usable power acquisition unit 157, and a control unit 121A by executing a program stored in the ROM.

The current/voltage acquisition unit 151 acquires a charge/discharge current Ib detected by the current sensor 107 and a terminal voltage Vb detected by the voltage sensor 109.

The differential calculation unit 152 differentially calculates the charge/discharge current Ib and the terminal voltage Vb acquired by the current/voltage acquisition unit 151.

The internal resistance calculation unit 153 calculates an internal resistance Rn of the storage battery 103 from the following equation (1) based on a differential value $\Delta Ib$ of the charge/discharge current Ib and a differential value $\Delta Vb$ of the terminal voltage Vb calculated by the differential calculation unit 152.

$$Rn = \Delta Vb / \Delta Ib \qquad (1)$$

The open circuit voltage calculation unit 154 calculates an open circuit voltage OCV of the storage battery 103 from the following equation (2), based on the internal resistance Rn calculated by the internal resistance calculation unit 153 and the charge/discharge current Ib and terminal voltage Vb acquired by the current/voltage acquisition unit 151.

$$OCV = Vb + Ib \times Rn \quad (2)$$

The SOC derivation unit 155 derives the SOC of the storage battery 103 from the open circuit voltage OCV calculated by the open circuit voltage calculation unit 154 using a data table stored in advance in the ROM.

The temperature acquisition unit 156 acquires a temperature Tbat of the storage battery 103 detected by the temperature sensor 111.

The usable power acquisition unit 157 acquires information on the usable power Pa described above from the charger 113.

The control unit 121A includes a charging power determination unit 158, a first increase amount acquisition unit 159, a second increase amount calculation unit 160, a heater power determination unit 161, a third increase amount calculation unit 163, and an energization control unit 162.

The charging power determination unit 158 determines the charging power A [kW] based on the SOC of the storage battery 103 derived by the SOC derivation unit 155, the temperature Tbat of the storage battery 103 acquired by the temperature acquisition unit 156, and the information of the usable power Pa acquired by the usable power acquisition unit 157.

The power that the storage battery 103 can accept for the combination of the SOC and the temperature Tbat is predetermined. The ROM of the ECU 121 stores a data table in which the combination of the SOC and the temperature Tbat and the power that can be accepted by the storage battery 103 are associated with each other.

The charging power determination unit 158 reads out the power corresponding to the combination of the SOC and the temperature Tbat from the data table, and when the read power is less than usable power Pa, determines the read power as charging power A, The charging power determination unit 158 determines the usable power Pa as the charging power A when the read power is equal to or more than the usable power Pa. The charging power determination unit 158 controls the charger 113 so that the determined charging power A is supplied to the storage battery 103 and the heater 115.

The first increase amount acquisition unit 159 acquires a first increase amount $C_{Bx}$ in the effective capacity of the storage battery 103 when the storage battery 103 is heated for a predetermined time (hereinafter referred to as a time t) by the heater 115 supplied with each of the above three power consumptions Bx (1 kw, 3 kw, and 6 kw).

In the ROM of the ECU 121, a data table which associates the combination of the temperature and the SOC of the storage battery 103 with the increase amount in the effective capacity of the storage battery 103 when the storage battery 103 is heated for a period of time t by the heater 115 supplied with power consumption Bx is stored in advance.

Figure 3:
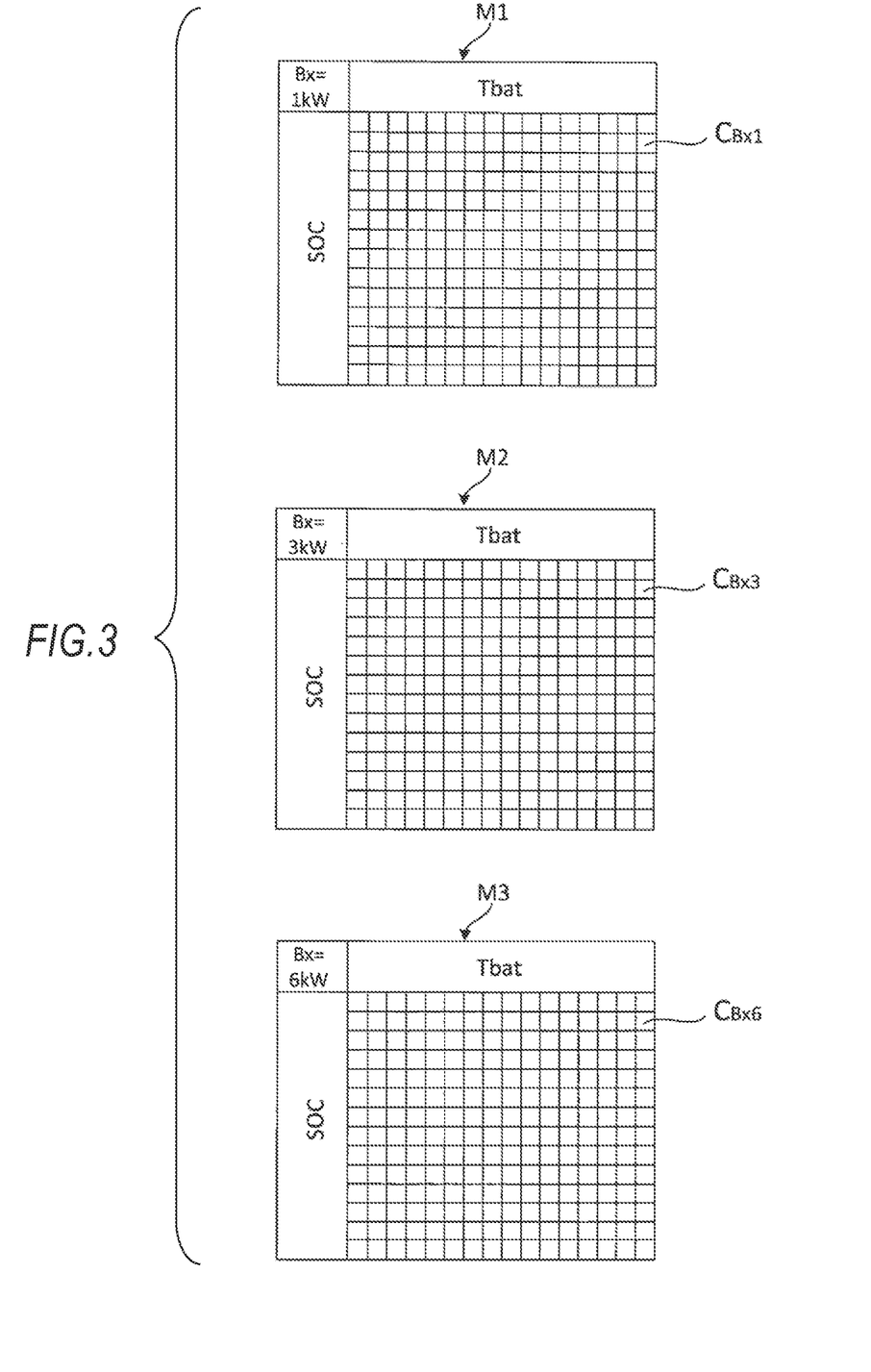
FIG. 3 is a diagram schematically illustrating a data table stored in a ROM of the ECU illustrated in FIG. 1.

FIG. 3 is a diagram schematically illustrating the data table stored in the ROM of the ECU 121. As illustrated in FIG. 3, a data table M1, a data table M2, and a data table M3 are stored in the ROM.

The data table M1 is a table that stores an increase amount $C_{Bx1}$ [kwh] in the effective capacity of the storage battery 103 when the storage battery 103 is heated for a period of time t by the heater 115 supplied with 1 kW of power for each combination of the SOC and the temperature That at the start of heating.

The data table M2 is a table that stores an increase amount $C_{Bx3}$ [kwh] in the effective capacity of the storage battery 103 when the storage battery 103 is heated for a period of time t by the heater 115 supplied with 3 kW of power for each combination of the SOC and the temperature Tbat at the start of heating.

The data table M3 is a table that stores an increase amount $C_{Bx6}$ [kwh] in the effective capacity of the storage battery 103 when the storage battery 103 is heated for a period of time t by the heater 115 supplied with 6 kW of power for each combination of the SOC and the temperature Tbat at the start of heating.

The first increase amount acquisition unit 159 reads out the increase amount $C_{Bx1}$, the increase amount $C_{Bx3}$, and the increase amount $C_{Bx6}$ corresponding to the combination of the SOC derived by the SOC derivation unit 155 and the temperature That acquired by the temperature acquisition unit 156 from each of the data table M1, the data table M2, and the data table M3 and acquires these increase amounts as the first increase amount $C_{Bx}$.

The second increase amount calculation unit 160 calculates a second increase amount $D_{Bx}$ [kWh] in the effective capacity of the storage battery 103 due to the charging by the following equation (3) when the storage battery 103 is charged for a period of time t with the power excluding the power consumption Bx from the charging power A determined by the charging power determination unit 158.

$$D_{Bx} = (A - Bx) \times t \quad (3)$$

The second increase amount calculation unit 160 substitutes each of the power consumptions of 1 kW, 3 kW, and 6 kW that can be set in the heater 115 into "Bx" in the equation (3) and calculates the second increase amount $D_{Bx}$ ($D_{1kw}$, $D_{3kw}$, and $D_{6kw}$) in three ways.

The third increase amount calculation unit 163 calculates the third increase amount E in the effective capacity of the storage battery 103 due to the charging by the calculation formula of "A×t", when the storage battery 103 is charged for a period of time t with the charging power A determined by the charging power determination unit 158.

The heater power determination unit 161 performs the calculation of the following equations (4) to (6) to calculate an increase amount $E_{Bx}$ [kWh] in the effective capacity of the storage battery 103 when 1 kW, 3 kW, and 6 kW are supplied to the heater 115 and the storage battery 103 is heated and charged for a period of time t.

$$E_{Bx} = D_{1kw} + C_{Bx1} \quad (4)$$

$$E_{Bx} = D_{3kw} + C_{Bx3} \quad (5)$$

$$E_{Bx} = D_{6kw} + C_{Bx6} \quad (6)$$

Then, the heater power determination unit 161 determines which of the increase amounts $E_{Bx}$ obtained by the calculation of the equations (4) to (6) and the third increase amount E is the maximum, and then when any of the three increase amounts $E_{Bx}$ is the maximum, the heater power determination unit 161 determines the power consumption Bx used in calculating the maximum increase amount $E_{Bx}$ as the heater power supplied to the heater 115 when the storage battery 103 is charged.

For example, when the increase amount $E_{Bx}$ obtained by the equation (4) is the maximum, the heater power determination unit 161 determines the heater power as 1 kW, and when the increase amount $E_{Bx}$ obtained by the equation (5) is the maximum, the heater power determination unit 161 determines the heater power as 3 kW, and further when the increase amount $E_{Bx}$ obtained by the equation (6) is the maximum, the heater power determination unit 161 determines the heater power as 6 kW.

On the other hand, when it is determined that the increase amount E is the maximum among the three increase amounts $E_{Bx}$ and the increase amount E, the heater power determination unit 161 determines that the heater power supplied to the heater 115 is "zero", that is, no power is supplied to the heater 115.

The energization control unit 162 performs a control of closing the switch unit 117 and turning off the IGBT 115c when it is determined by the heater power determination unit 161 not to supply power to the heater 115. The energization control unit 162 closes the switch unit 117 and sets the output of the heater 115 to the determined heater power when the heater power determination unit 161 determines the heater power other than zero.

The operation of the power consumption control device configured as described above will be described. When the plug 123 is connected to the external power supply, the temperature acquisition unit 156 of the ECU 121 acquires the temperature Tbat of the storage battery 103, and the SOC of the storage battery 103 is derived by the SOC derivation unit 155 of the ECU 121, and further information on the usable power Pa is acquired by the usable power acquisition unit 157 of the ECU 121. Then, based on the temperature Tbat, the SOC, and the information on the usable power Pa, charging power A is determined by the charging power determination unit 158 of the ECU 121 and the charging power A can be supplied from the charger 113 to the storage battery 103 and the heater 115.

Then, based on the determined charging power A, the data tables M1 to M3 in FIG. 3, the temperatures Tbat and SOC of the storage battery 103, and the power consumption Bx which can be set, the first increase amount $C_{Bx}$ ($C_{Bx1}$, $C_{Bx3}$, $C_{Bx6}$) is acquired and the second increase amount $D_{Bx}$ ($D_{1kw}$, $D_{3kw}$, $D_{6kw}$) is calculated, and then the process of calculating the increase amount $E_{Bx}$ which is the total value of the first increase amount $C_{Bx}$ ($C_{Bx1}$, $C_{Bx3}$, $C_{Bx6}$) and the second increase amount $D_{Bx}$ ($D_{1kw}$, $D_{3kw}$, $D_{6kw}$) and the process of calculating the third increase amount E is performed by the control unit 121A of the ECU 121.

Next, the maximum value among the third increase amount E and the increase amount $E_{Bx}$ calculated corresponding to each of the power consumptions Bx (1 kW, 3 kW, 6 kW) is determined. When the third increase amount E is maximum, the heater power capable of maximizing the increase amount in the effective capacity of the storage battery 103 at the time when the time t has elapsed from the present time is determined as "zero". That is, it is determined that power is not supplied to the heater 115. When any of the three increase amounts $E_{Bx}$ is maximum, the power consumption Bx corresponding to the maximum increase amount $E_{Bx}$ is determined as the heater power capable of maximizing the increase amount in the effective capacity of the storage battery 103 at the time when the time t has elapsed from the present time.

When the heater power is determined to be a value other than zero, the energization control unit 162 of the ECU 121 controls the switch unit 117 in the closed state and sets the output of the heater 115 to the determined value of the heater power. The energization control unit 162 of the ECU 121 controls to close the switch unit 117 and turn off the IGBT 115c when the heater power is determined to be zero. Next, the charging power A and the heater power are determined every time the time t elapses and the output of the heater 115 is adjusted according to the determined contents.

When the heater power is determined to be a value other than zero by the above operation, if the charging power A is greater than the output of the heater 115 set by the energization control unit 162, the power consumption Bx of the charging power A supplied from the charger 113 is supplied to the heater 115 and the remaining power obtained by subtracting the power consumption Bx from the charging power A is supplied to the storage battery 103.

On the other hand, when charging power A is smaller than the output of heater 115 set by the energization control unit 162, all of the charging power A supplied from the charger 113 is supplied to the heater 115, and further the shortage power obtained by subtracting the charging power A from the output of the set heater 115 is supplied from the storage battery 103 to the heater 115. That is, the storage battery 103 is not charged, but the heater 115 is heated by the electric power discharged from the storage battery 103.

When the heater power is determined to be zero, the charging power A supplied from the charger 113 is not supplied to the heater 115, but is supplied to the storage battery 103.

As described above, according to the power consumption control device illustrated in FIG. 1, the charging power A is allocated to the storage battery 103 and the heater 115 so that the increase amount in the effective capacity of the storage battery 103 after the lapse of time t is maximized. Therefore, no matter when the charging is ended, it is possible to obtain a state in which the effective capacity is maximized at the end of the charging, and thus efficient charging is possible. As a result, the cruising range of the electric vehicle at the end of charging can be extended.

According to the power consumption control device illustrated in FIG. 1, since the output of the heater 115 is variable, the maximum output of the heater 115 can be made a large value. Therefore, the above effect can be obtained while sufficiently satisfying the performance required in a low temperature environment in an electric vehicle.

According to the power consumption control device illustrated in FIG. 1, even when the charging power A is low and insufficient for the heater power determined by the heater power determination unit 161, the shortage power can be supplied from the storage battery 103 to the heater 115.

Here, although the SOC of the storage battery 103 decreases, it is possible to obtain a state in which the increase in the effective capacity of the storage battery 103 due to the heating of the heater 115 exceeds the decrease in the effective capacity of the storage battery 103 due to the decrease in the SOC. Therefore, even when the storage battery 103 cannot be sufficiently charged because the power consumption of the above equipment installed in the electric vehicle is high, the determined heater power is high, or the like, the effective capacity of the storage battery 103 can be maximized.

When the plug 123 is connected to an external power source such as a rapid charger which can supply a large amount of power and the above-described usable power Pa becomes sufficiently large, specifically, when the surplus power obtained by subtracting the charging power A from the usable power Pa is equal to or more than the minimum value (1 kW) of the power consumption Bx of the heater 115, it is preferable to stop the processing by the first increase amount acquisition unit 159, the second increase amount calculation unit 160, and the heater power determination unit 161.

Here, the energization control unit 162 controls the switch unit 117 in the closed state, and further controls the heater 115 to have the maximum output (any one of 1 kw, 3 kw, and 6 kw) within the surplus power described above, and then the energization control unit 162 supplies the power obtained by applying the output of the controlled heater 115 to the charging power A from the charger 113 to the storage battery 103 and the heater 115.

As a result, the heater 115 is supplied with the above-described maximum electric power and the storage battery 103 is supplied with the charging power A. Accordingly, the heater 115 can be operated at the maximum output that can be obtained at present and the storage battery 103 can be charged at full power by the charging power A. Therefore, it is possible to achieve both a shortening of the charging time of the storage battery 103 and an increase in the effective capacity.

In the above description, the heater 115 may be one (for example, a sheet-shaped positive temperature coefficient (PTC) heater attached to the storage battery 103) that directly heats the storage battery 103 with the heater body 115a without using water.

As described above, the following matters are disclosed in the specification.

(1) A power consumption control device, including:

a storage battery (for example, the storage battery 103 in the embodiment described above) configured to supply power to an electric motor (for example, the electric motor 101 in the embodiment described above) as a drive source for a plug-in type electric vehicle;

a heating unit (for example, the heater 115 in the embodiment described above) configured to heat the storage battery by receiving supply of any one of a plurality of heating powers (for example, the power consumptions Bx in the embodiment described above);

a storage unit (for example, the ROM of the ECU 121 in the embodiment described above) storing a combination of a temperature of the storage battery and a remaining capacity (for example, the SOC in the embodiment described above) of the storage battery in association with an increase amount (for example, the increase amount $C_{Bx}$ in the embodiment described above) in an effective capacity of the storage battery when the storage battery is heated by the heating unit which is supplied with each of the plurality of heating powers;

a power conversion unit (for example, the charger 11 in the embodiment described above) configured to convert a power supplied from an external power source and to supply the converted power to at least one of the storage battery and the heating unit; and a control unit (for example, the control unit 121A in the embodiment described above) configured to determine a first power (for example, the charging power A in the embodiment described above) which can be charged to the storage battery and to distribute the first power to the storage battery and the heating unit based on a power suppliable to the storage battery and the heating unit (for example, the usable power Pa in the embodiment described above) of the converted power, the temperature of the storage battery, and the remaining capacity of the storage battery, where the control unit distributes the first power to the storage battery and the heating unit so that the increase amount in the effective capacity of the storage battery is maximized based on the first power, the increase amount for each of the plurality of heating powers corresponding to the temperature of the storage battery and the remaining capacity of the storage battery, and the plurality of heating powers.

According to (1), the first power is distributed to the storage battery and the heating unit so that the increase amount in the effective capacity of the storage battery is maximized. Therefore, the cruising range of the electric vehicle at the end of charging can be extended.

(2) The power consumption control device according to (1), where the control unit acquires a first increase amount (for example, the increase amount $C_{Bx}$ in the embodiment described above) in the effective capacity of the storage battery due to heating when each of the plurality of heating powers is supplied to the heating unit to heat the storage battery for a predetermined time (for example, the time t in the embodiment described above) from the storage unit, calculate a second increase amount (for example, the increase amount $D_{Bx}$ in the embodiment described above) in the effective capacity of the storage battery due to charging when the storage battery is charged for the predetermined time with a power excluding each of the plurality of the heating powers from the first power, calculates a total value (for example, $E_{Bx}$ in the embodiment described above) of the first increase amount and the second increase amount, and further calculates a third increase amount in the effective capacity of the storage battery due to charging when the storage battery is charged with the first power for the predetermined time, and when any one of total values is the maximum among the total values and the third increase amount, the control unit supplies the heating power used in calculating the maximum total value to the heating unit, and when the third increase amount is the maximum, the control unit cuts off supply of the first power to the heating unit.

According to (2), the total value of the first increase amount in the effective capacity when it is heated for a predetermined time by the heating power and the second increase amount in the effective capacity when the storage battery is charged for a predetermined time by the power excluding the heating power from the first power is calculated for each heating power and the third increase amount in the effective capacity when the storage battery is charged for a predetermined time by the charging power is calculated, and then when any one of the total values among the total values and the third increase amount becomes the maximum, the heating power used in calculating the maximum total value is supplied to the heating unit, and when the third increase amount is the maximum, the supply of the first electric power to the heating unit is cut off. Therefore, the effective capacity of the storage battery can be maximized regardless of when the power supply from the external power supply is stopped. Therefore, the cruising range of the electric vehicle at the time when charging is ended can be maximized.

(3) The power consumption control device according to (2), where when any one of the total values is the maximum and the heating power used in calculating the maximum total value is equal to or more than the first power, the first power is supplied to the heating unit, and further, a shortage power obtained by subtracting the first power from the heating power is supplied from the storage battery to the heating unit.

According to (3), even when the power to be supplied to the heating unit is insufficient, since the storage battery can supply the shortage power to the heating unit, the storage battery can be heated to maximize the effective capacity.

(4) The power consumption control device according to any one of (1) to (3), where the power conversion unit is configured to supply a part of the converted power to a device mounted on the electric vehicle other than the storage battery and the heating unit, and the control unit determines the first power based on a power excluding the power supplied to the device from the converted power, the temperature of the storage battery, and the remaining capacity of the storage battery.

According to (4), since the power is supplied from an external power source to the device other than the storage battery and the heating unit, the device can be used even during charging. Then, even when the device is used, the effective capacity of the storage battery can be maximized.

(5) The power consumption control device according to any one of (1) to (4), where when a surplus power obtained by subtracting the first power from the power suppliable to the storage battery and the heating unit of the converted power is equal to or more than the minimum value among the plurality of heating powers, the control unit supplies the first power to the storage battery and supplies the heating unit with the maximum value of heating powers that are equal to or less than the surplus power among the plurality of heating powers.

According to (5), when the power supplied from the external power source is sufficiently large, the storage battery can be charged and heated at full power. Therefore, it is possible to shorten the charging time of the storage battery and expand the effective capacity at the same time.

According to the invention, it is possible to provide a power consumption control device capable of maximizing an effective capacity of a storage battery at the end of charging of the storage battery and increasing a cruising range of an electric vehicle at the end of charging.

REFERENCE SIGNS LIST

103 storage battery
115 heater
M1, M2, M3 data table
121 ECU
121A control unit

The invention claimed is:

1. A power consumption control device, comprising:
a storage battery configured to supply power to an electric motor as a drive source for a plug-in type electric vehicle;
a heating unit configured to heat the storage battery by receiving supply of any one of a plurality of heating powers;
a storage unit storing a combination of a temperature of the storage battery and a remaining capacity of the storage battery in association with an increase amount in an effective capacity of the storage battery when the storage battery is heated by the heating unit which is supplied with each of the plurality of heating powers;
a power conversion unit configured to convert a power supplied from an external power source and to supply the converted power to at least one of the storage battery and the heating unit; and
a control unit configured to determine a first power which can be charged to the storage battery and to distribute the first power to the storage battery and the heating unit based on a power suppliable to the storage battery and the heating unit of the converted power, the temperature of the storage battery, and the remaining capacity of the storage battery, wherein the control unit distributes the first power to the storage battery and the heating unit so that the increase amount in the effective capacity of the storage battery is maximized based on the first power, the increase amount for each of the plurality of heating powers corresponding to the temperature of the storage battery and the remaining capacity of the storage battery, and the plurality of heating powers.

2. The power consumption control device according to claim 1, wherein
the control unit acquires a first increase amount in the effective capacity of the storage battery due to heating when each of the plurality of heating powers is supplied to the heating unit to heat the storage battery for a predetermined time from the storage unit, calculate a second increase amount in the effective capacity of the storage battery due to charging when the storage battery is charged for the predetermined time with a power excluding each of the plurality of the heating powers from the first power, calculates a total value of the first increase amount and the second increase amount, and further calculates a third increase amount in the effective capacity of the storage battery due to charging when the storage battery is charged with the first power for the predetermined time, and when any one of total values is the maximum among the total values and the third increase amount, the control unit supplies the heating power used in calculating the maximum total value to the heating unit, and when the third increase amount is the maximum, the control unit cuts off supply of the first power to the heating unit.

3. The power consumption control device according to claim 2, wherein
when any one of the total values is the maximum and the heating power used in calculating the maximum total value is equal to or more than the first power, the first power is supplied to the heating unit, and further, a shortage power obtained by subtracting the first power from the heating power is supplied from the storage battery to the heating unit.

4. The power consumption control device according to claim 1, wherein
the power conversion unit is configured to supply a part of the converted power to a device mounted on the electric vehicle other than the storage battery and the heating unit, and
the control unit determines the first power based on a power excluding the power supplied to the device from the converted power, the temperature of the storage battery, and the remaining capacity of the storage battery.

5. The power consumption control device according to claim 1, wherein
when a surplus power obtained by subtracting the first power from the power suppliable to the storage battery and the heating unit of the converted power is equal to or more than the minimum value among the plurality of heating powers, the control unit supplies the first power to the storage battery and supplies the heating unit with the maximum value of heating powers that are equal to or less than the surplus power among the plurality of heating powers.

* * * * *